(12) United States Patent
Griffith et al.

(10) Patent No.: US 8,028,640 B2
(45) Date of Patent: Oct. 4, 2011

(54) COMPOSITIONS AND METHODS FOR SEALING

(75) Inventors: Steven P. Griffith, Oregon, WI (US); Carl Van Damme, Omro, WI (US)

(73) Assignee: Xtreme Seal, LLC, Madison, WI (US)

( * ) Notice: Subject to any disclaimer, the term of this patent is extended or adjusted under 35 U.S.C. 154(b) by 0 days.

(21) Appl. No.: 11/103,850

(22) Filed: Apr. 12, 2005

(65) Prior Publication Data
US 2005/0236102 A1  Oct. 27, 2005

Related U.S. Application Data

(60) Provisional application No. 60/561,441, filed on Apr. 12, 2004.

(51) Int. Cl.
*B63B 17/00* (2006.01)
*B63B 17/02* (2006.01)
*F16J 15/10* (2006.01)

(52) U.S. Cl. ........ 114/361; 277/644; 277/652; 277/647; 277/648; 277/921; 135/119

(58) Field of Classification Search .................. 277/644, 277/652, 647, 648, 921; 114/361; 135/119; 296/107.04, 7.09, 100.161
See application file for complete search history.

(56) References Cited

U.S. PATENT DOCUMENTS

| | | | | |
|---|---|---|---|---|
| 2,566,777 A * | 9/1951 | Schmidt | | 220/681 |
| 2,766,055 A * | 10/1956 | Poltorak | | 277/648 |
| 2,767,444 A * | 10/1956 | Spraragen | | 277/641 |
| 2,937,652 A * | 5/1960 | Zimmer, Jr et al. | | 135/124 |
| 2,954,999 A * | 10/1960 | Fingerman et al. | | 296/121 |
| 2,961,725 A * | 11/1960 | McGee | | 114/361 |
| 2,974,078 A * | 3/1961 | Petritz et al. | | 52/417 |
| 3,090,646 A * | 5/1963 | Johnson | | 296/107.11 |
| 3,241,877 A * | 3/1966 | Tate | | 296/136.09 |
| 3,271,039 A * | 9/1966 | Kohl et al. | | 277/652 |
| 3,373,464 A * | 3/1968 | Ausnit | | 24/586.1 |
| 3,554,567 A * | 1/1971 | Carroll et al. | | 277/641 |
| 3,604,440 A * | 9/1971 | Wilson | | 114/361 |
| 3,666,277 A * | 5/1972 | Hubach et al. | | 277/640 |
| 4,218,088 A * | 8/1980 | Swindlehurst et al. | | 296/210 |
| 4,292,913 A * | 10/1981 | Siebert et al. | | 114/219 |
| 4,572,570 A * | 2/1986 | Trucco | | 296/107.07 |
| 4,575,105 A * | 3/1986 | le Pierres | | 277/637 |
| 4,692,969 A * | 9/1987 | Johnson | | 24/326 |
| 4,784,428 A * | 11/1988 | Moy et al. | | 296/107.07 |
| 4,826,232 A * | 5/1989 | Wissler | | 296/216.09 |
| 4,864,774 A * | 9/1989 | Onishi et al. | | 49/440 |
| 4,903,629 A * | 2/1990 | Maudlin et al. | | 114/361 |
| 5,189,980 A * | 3/1993 | Zirkelbach et al. | | 114/361 |
| 5,251,917 A * | 10/1993 | Chee et al. | | 277/645 |
| 5,331,993 A * | 7/1994 | Billbury | | 135/119 |
| 5,339,763 A * | 8/1994 | Erskine | | 114/361 |
| 5,367,977 A * | 11/1994 | Ellis et al. | | 114/361 |

(Continued)

*Primary Examiner* — Alison Pickard
(74) *Attorney, Agent, or Firm* — Casimir Jones, S.C.

(57) ABSTRACT

The present invention relates to compositions and methods for creating insulating seals for use in a variety of applications, and to seals created by such compositions and methods. In particular, the present invention provides novel compositions and methods for creating insulating edge seals that provide multiple contact surfaces. The present invention further provides seals that facilitate attachment of flexible covering materials (such as fabrics, plastics, metals, etc.) to hard surfaces (such as plastics, metals, woods, etc.). The present invention is particularly useful for creating insulating edge seals that provide a means of attachment for removable covers for vehicles (such as tops for automobiles, watercraft, and aircraft), structures, and objects.

6 Claims, 3 Drawing Sheets

U.S. PATENT DOCUMENTS

| | | | |
|---|---|---|---|
| 5,489,146 A * | 2/1996 | Fischbach | 296/102 |
| 5,633,048 A * | 5/1997 | Bodin | 427/444 |
| 5,664,519 A * | 9/1997 | Erskine | 114/361 |
| 5,702,147 A * | 12/1997 | Essig | 296/106 |
| 5,775,767 A * | 7/1998 | Harrison et al. | 296/107.09 |
| 5,839,388 A * | 11/1998 | Vadney | 114/361 |
| 5,851,637 A * | 12/1998 | Sofie et al. | 428/192 |
| 5,910,094 A | 6/1999 | Kraft et al. | |
| 6,026,761 A * | 2/2000 | Parniske et al. | 114/343 |
| 6,170,901 B1 * | 1/2001 | Hartmann et al. | 296/107.01 |
| 6,227,604 B1 * | 5/2001 | Grace | 296/107.09 |
| 6,244,601 B1 * | 6/2001 | Buchholz et al. | 277/637 |
| 6,287,669 B1 * | 9/2001 | George et al. | 428/156 |
| 6,338,522 B1 * | 1/2002 | LeBlanc | 296/107.01 |
| 6,361,055 B1 * | 3/2002 | Grover | 277/652 |
| 6,491,334 B1 * | 12/2002 | Anders | 296/107.04 |
| 6,517,150 B2 * | 2/2003 | De Gaillard et al. | 296/216.06 |
| 6,543,837 B2 * | 4/2003 | Fischer et al. | 296/107.11 |
| 6,595,155 B1 * | 7/2003 | Akers | 114/361 |
| 6,685,252 B2 * | 2/2004 | Graf et al. | 296/108 |
| 6,895,885 B2 * | 5/2005 | Shearer et al. | 114/361 |
| 7,014,246 B2 * | 3/2006 | Huedepohl | 296/107.07 |
| 7,096,816 B2 * | 8/2006 | Whited et al. | 114/361 |
| 7,143,717 B2 * | 12/2006 | Murphy | 114/361 |
| 7,434,533 B2 * | 10/2008 | Erskine et al. | 114/361 |
| 7,434,534 B2 * | 10/2008 | Erskine et al. | 114/361 |
| 7,621,584 B2 * | 11/2009 | Just | 296/121 |
| 2002/0174820 A1 * | 11/2002 | Shearer et al. | 114/361 |
| 2004/0251707 A1 * | 12/2004 | Garska | 296/107.11 |
| 2008/0190349 A1 * | 8/2008 | Erskine et al. | 114/361 |

* cited by examiner

COMPOSITIONS AND METHODS FOR SEALING

The present invention claims priority to U.S. Provisional Patent Application Ser. No. 60/561,441, filed Apr. 12, 2004, herein incorporated by reference in its entirety.

FIELD OF THE INVENTION

The present invention relates to compositions and methods for creating insulating seals for use in a variety of applications, and to seals created by such compositions and methods. In particular, the present invention provides novel compositions and methods for creating insulating edge seals that provide multiple contact surfaces. The present invention further provides seals that facilitate attachment of flexible covering materials (such as fabrics, plastics, metals, etc.) to hard surfaces (such as plastics, metals, woods, etc.). The present invention is particularly useful for creating insulating edge seals that provide a means of attachment for removable covers for vehicles (such as tops for automobiles, watercraft, and aircraft), structures, and objects.

BACKGROUND OF THE INVENTION

Compositions and methods for creating insulating edge seals are known in the art. However, existing seal technologies have limitations with regard to creating insulating edge seals that facilitate attachment of flexible covering materials to hard surfaces. The art is in need of novel compositions and methods for creating insulating edge seals that provide improved contact surfaces for more secure attachment and better insulation when used to facilitate attachment of flexible covering materials to hard surfaces.

DETAILED DESCRIPTION OF THE INVENTION

The present invention relates to compositions and methods for creating insulating seals for use in a variety of applications, and to seals created by such compositions and methods. In particular, the present invention provides novel compositions and methods for creating insulating edge seals that provide multiple contact surfaces. The present invention further provides seals that facilitate attachment of flexible covering materials (such as fabrics, plastics, metals, etc.) to hard surfaces (such as plastics, metals, woods, etc.). The present invention is particularly useful for creating insulating edge seals that provide a means of attachment for removable covers for vehicles (such as tops for automobiles, watercraft, and aircraft), structures, and objects.

The following discussion provides a description of certain preferred illustrative embodiments of the present invention and is not intended to limit the scope of the invention. The description is provided in the following sections:

I. Sealing Compositions

The present invention provides compositions for creating insulating edge seals. In preferred embodiments, the material used to create the seal comprises rubber. In other embodiments, the material used to create the seal comprises plastic. In yet other embodiments, the material used to create the seal comprises metal, ceramic, or other materials. In particularly preferred embodiments, the material used to create the seal comprises ethylene propylene diene monomer (EPDM), but it should be understood that the compositions and methods of the present invention are applicable and intended for use with a wide variety of similar materials.

In preferred embodiments of the present invention, the material used to create the seal is shaped by an extrusion process. In other embodiments, the material used to create the seal is shaped by a molding process. In particularly preferred embodiments, the material used to create the seal retains flexibility after forming. In some embodiments, the material used to create the seal is capable of being securely attached to the surface of an object. The seals of the present invention may be attached to the surfaces of objects by any suitable means. In some embodiments, the seal may be attached to one or more flexible objects or materials, such as fabrics, plastics, rubbers, metals, or papers. In other embodiments, the seal may be attached to one or more rigid objects or hard surfaces, such as plastics, rubbers, metals, or woods. In preferred embodiments, the seal may be simultaneously attached to multiple objects. In yet other embodiments, the seal may be attached to one or more objects by means of gluing, stitching, nailing, bolting, tacking, fastening, snapping, bonding, Velcro, or any suitable means.

Figure 1:
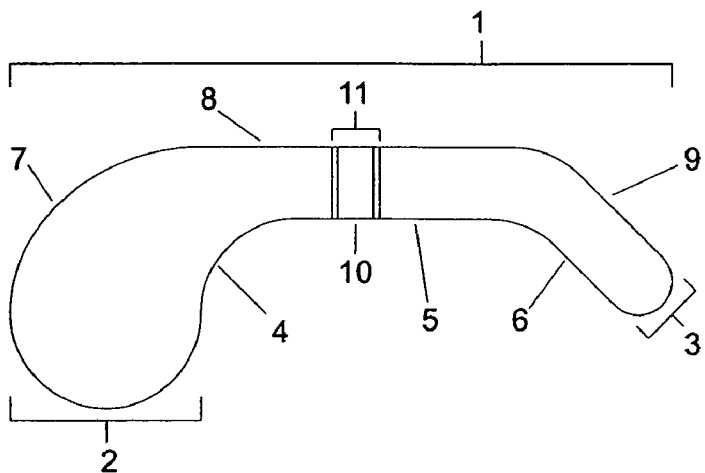
FIG. 1 shows a cross-sectional view of a seal in one embodiment of the present invention.

The present invention contemplates seals of various shapes, sizes, and configurations. In some embodiments, the seal is configured to have at least one contact surface for attachment to the surface of an object. In preferred embodiments, the seal has more than one contact surface for attachment to one or more surfaces of an object. In particularly preferred embodiments, the seal has at least three contact surfaces for attachment to three or more surfaces of a first object, and one or more surfaces of a second object. FIG. 1 shows one embodiment of the present invention, in which the seal is configured to have three contact surfaces (labeled 4, 5, and 6) for attachment to the surface of a first object, and at least one contact surface for attachment to the surface of a second object (labeled 8).

The seals of the present invention can be used in a wide variety of applications. In a preferred embodiment of the present invention, an insulated edge seal is created comprising a seal configured to have three contact surfaces for attachment to the surface of a first object, and at least one contact surface for attachment to the surface of a second object. In particularly preferred embodiments, the seal is attached to a first object having a rigid surface, and a second object having a flexible surface. For example, the present invention is particularly useful for providing an insulated edge seal by which a flexible covering material may be attached to a rigid surface material. In preferred embodiments, the flexible covering material is comprised of fabric, plastic, metal, or paper, and the rigid surface material is comprised of plastic, metal, rubber, or wood. In particularly preferred embodiments, the present invention provides an insulated edge seal that is used to attach a removable, flexible top covering (such as a convertible top on an automobile, marine vessel, or aircraft), to the body, hull, fuselage, or other suitable rigid surface of a land, water, or air vehicle. The seals of the present invention may be provided in different colors (e.g., to match or complement an associated flexible covering material or rigid surface material). The present invention also provides compositions comprising flexible materials affixed to seals, as well as such flexible materials attached via seals to other objects.

II. Sealing Methods

The present invention provides methods of creating an insulated edge seal by which a flexible covering material may be attached to a rigid surface material. In particularly preferred embodiments, the present invention provides methods of creating an insulated edge seal that is used to attached a removable, flexible top covering (such as a convertible top on an automobile, marine vessel, or aircraft), to the body, hull, fuselage, or other suitable rigid surface of a land, water, or air vehicle, in a manner that provides insulation against outside environmental elements such as water, wind, heat, and cold.

III. Examples

FIG. 1 shows a cross-sectional view of one embodiment of the seal of the present invention. For convenience, the discussion focuses on a particular orientation of the seal in space, but it will be understood that the present invention may be used in any spatial orientation. The seal 1 is approximately one to two inches in width (although the present invention is not so limited), and comprises a left edge 2 and a right edge 3, both of which are curved downward to provide a concave exterior lower surface comprising a curved left portion 4, a flat central portion 5, and a curved right portion 6. The upper surface of the seal comprises a downward curved left portion 7, a flat central portion 8, and a downward curved right portion 9. As shown, the thicker left edge 2 is approximately 0.5 inches in thickness, and the thinner right edge 3 is approximately 0.2 inches in thickness, although in some embodiments the left and right edges are the same thickness. In other embodiments, they differ in thickness. The left edge 2 is curved downward such that the total height of the seal from the lower-most surface of the left edge 2 to the upper-most surface of the top portion 8 is approximately 0.7 inches. The lower surface of the seal is designed to provide three points of contact with an object such as a side wall of a marine vessel hull. Portion 5 is placed in contact with a top edge surface of an object, and portions 4 and 6 are placed in contact with the side edge surfaces of the object, forming a seal with three contact surfaces. The seal may be attached to the surface of an object using any suitable means, such as by means of gluing, stitching, nailing, bolting, tacking, fastening, snapping, bonding, or Velcro. FIG. 1 shows a snap fastener 10 placed through an appropriately shaped hole 11 through the upper and lower surfaces of the flat central portion of the seal. The seal may be attached via one or more snap fasteners to an edge surface of an object, providing a seal that is secure, yet easily removable. One or more additional objects may be attached to the upper surfaces 7, 8, or 9 of the seal. In preferred embodiments, the upper surface of the seal is used to attach one or more objects that comprise a flexible top covering for the object attached to the lower surface of the seal.

Figure 2:
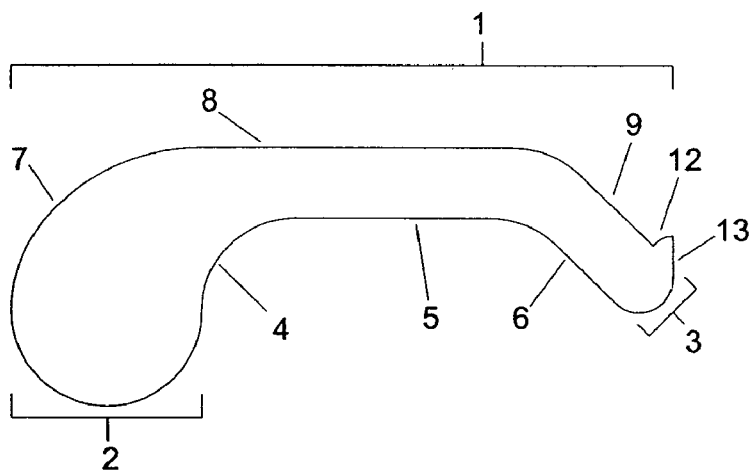
FIG. 2 shows a cross-sectional view of a seal in a second embodiment of the present invention.

FIG. 2 shows a cross-sectional view of one embodiment of the seal of the present invention. For convenience, the discussion focuses on a particular orientation of the seal in space, but it will be understood that the present invention may be used in any spatial orientation. The seal 1 is approximately one to two inches in width (although the present invention is not so limited), and comprises a left edge 2 and a right edge 3, both of which are curved downward to provide a concave exterior lower surface comprising a curved left portion 4, a flat central portion 5, and a curved right portion 6. The upper surface of the seal comprises a downward curved left portion 7, a flat central portion 8, and a downward curved right portion 9. The curved right portion 9 has a short, angled protruding surface 12, and a right edge surface 13. As shown, the thicker left edge 2 is approximately 0.5 inches in thickness, and the thinner right edge 3 is approximately 0.2 inches in thickness, although in some embodiments the left and right edges are the same thickness. In other embodiments, they differ in thickness. The left edge 2 is curved downward such that the total height of the seal from the lower-most surface of the left edge 2 to the upper-most surface of the top portion 8 is approximately 0.7 inches. The lower surface of the seal is designed to provide three points of contact with an object such as a side wall of a marine vessel hull. Portion 5 is placed in contact with a top edge surface of an object, and portions 4 and 6 are placed in contact with the side edge surfaces of the object, forming a seal with three contact surfaces. The seal may be attached to the surface of an object using any suitable means, such as by means of gluing, stitching, nailing, bolting, tacking, fastening, snapping, bonding, or Velcro. One or more additional objects may be attached to the upper surfaces 7, 8, 9, or 12 of the seal. In preferred embodiments, the upper surface of the seal is used to attach one or more objects that comprise a flexible top covering for the object attached to the lower surface of the seal.

Figure 3:
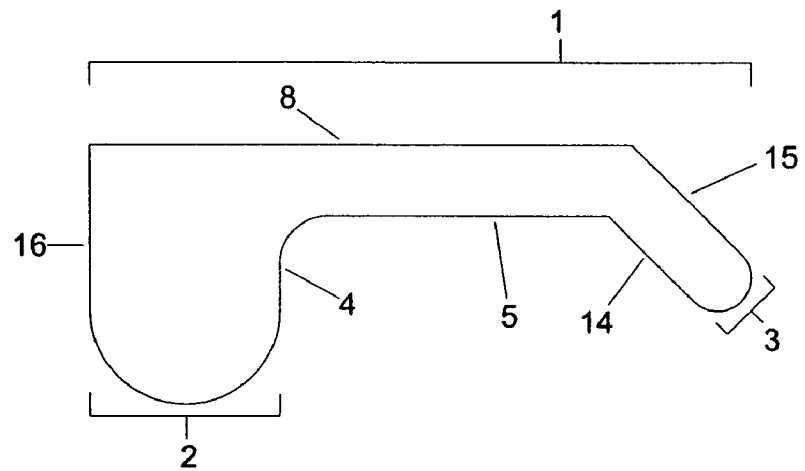
FIG. 3 shows a cross-sectional view of a seal in a third embodiment of the present invention.

FIG. 3 shows a cross-sectional view of another embodiment of the present invention. For convenience, the discussion focuses on a particular orientation of the seal in space, but it will be understood that the present invention may be used in any spatial orientation. The seal 1 is approximately one to two inches in width, and comprises a left edge 2 and a right edge 3, both of which are angled downward to provide a concave exterior lower surface comprising a curved left portion 4, a flat central portion 5, and angled right portion 14. The upper surface of the seal comprises a flat central portion 8 and a downward angled right portion 15. The seal has a left side surface 16 that is angled perpendicularly from the flat top surface 8. The thicker left edge 2 is approximately 0.5 inches in thickness, and the thinner right edge 3 is approximately 0.2 inches in thickness. The left edge 2 is angled downward such that the total height of the seal from the lower-most surface of the left edge 2 to the upper-most surface of the top portion 8 is approximately 0.7 inches. The lower surface of the seal is designed to provide three points of contact with an object such as a side wall of a marine vessel hull. Portion 5 is placed in contact with a top edge surface of an object, and portions 4 and 14 are placed in contact with the side edge surfaces of the object, forming a seal with three contact surfaces. The seal may be attached to the surface of an object using any suitable means, such as by means of gluing, stitching, nailing, bolting, tacking, fastening, snapping, bonding, or Velcro. One or more additional objects may be attached to the upper surfaces 8 or 15 of the seal. In preferred embodiments, the upper surface of the seal is used to attach one or more objects that comprise a flexible top covering for the object attached to the lower surface of the seal. Any of the seals of FIGS. 1, 2, and 3 may be prepared with the left or right side missing, such that the seal forms two points of contact with the rigid object.

Figure 4:
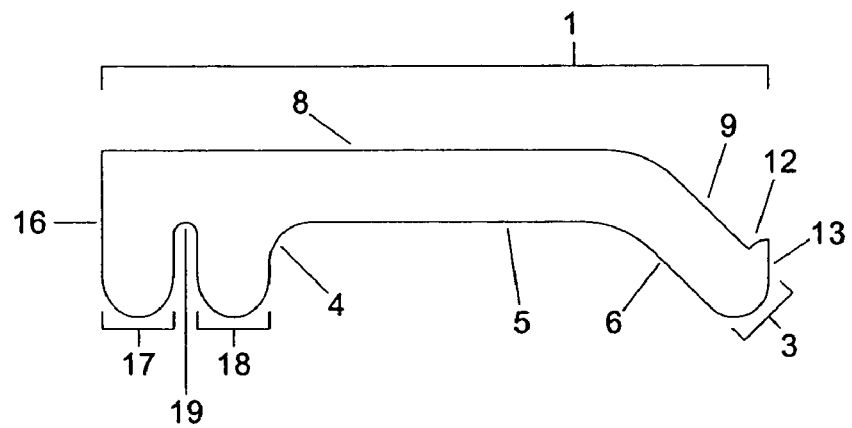
FIG. 4 shows a cross-sectional view of a seal in a fourth embodiment of the present invention.

FIG. 4 shows a cross-sectional view of another embodiment of the present invention. For convenience, the discussion focuses on a particular orientation of the seal in space, but it will be understood that the present invention may be used in any spatial orientation. The seal 1 comprises an outer left portion 17, an inner left portion 18, and a right portion 3, all three of which are curved downward to provide an indented groove 19 between the outer left portion 17 and the inner left portion 18, and a concave main exterior lower surface comprising a curved left portion 4, a flat central portion 5, and a right portion 6. The upper surface of the seal comprises a flat central portion 8 and a downward curved right portion 9. The curved right portion 9 has a short, angled protruding surface 12, and a right edge surface 13. The seal has a left side surface 16 that is angled perpendicularly from the flat top surface 8. The primary lower surface of the seal is designed to provide three points of contact with an object such as a side wall of a marine vessel hull. Portion 5 is placed in contact with a top edge surface of an object, and portions 4 and 6 are placed in contact with the side edge surfaces of the object, forming a seal with three contact surfaces. The indented groove 19 provides an additional contact surface. The seal may be attached to the surface of an object using any suitable means, such as by means of gluing, stitching, nailing, bolting, tacking, fastening, snapping, bonding, or Velcro. One or more additional objects may be attached to the upper surfaces 8, 9, or 12 of the seal. In preferred embodiments, the upper surface of the seal is used to attach one or more objects that comprise a flexible top covering for the object attached to the lower surface of the seal.

Figure 5:
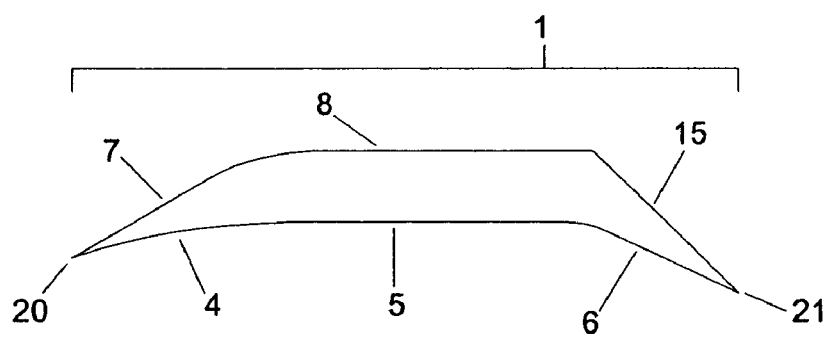
FIG. 5 shows a cross-sectional view of a seal in a fifth embodiment of the present invention.

FIG. 5 shows a cross-sectional view of one embodiment of the present invention. For convenience, the discussion focuses on a particular orientation of the seal in space, but it will be understood that the present invention may be used in any spatial orientation. The upper surface of the seal 1 comprises a downward curved left portion 7, a flat central portion 8, and a downward angled right portion 15. The concave lower surface comprises a curved left portion 4, a flat central portion 5, and a curved right portion 6. The top and bottom surfaces are joined by a flattened left edge 20 and a flattened right edge 21. The lower surface of the seal is designed to provide three points of contact with an object such as a side wall of a marine vessel hull. Portion 5 is placed in contact with a top edge surface of an object, and portions 4 and 6 are placed in contact with the side edge surfaces of the object, forming a seal with three contact surfaces. The seal may be attached to the surface of an object using any suitable means, such as by means of gluing, stitching, nailing, bolting, tacking, fastening, snapping, bonding, or Velcro. One or more additional objects may be attached to the upper surfaces 7, 8, or 15 of the seal. In preferred embodiments, the upper surface of the seal is used to attach one or more objects that comprise a flexible top covering for the object attached to the lower surface of the seal.

Figure 6:
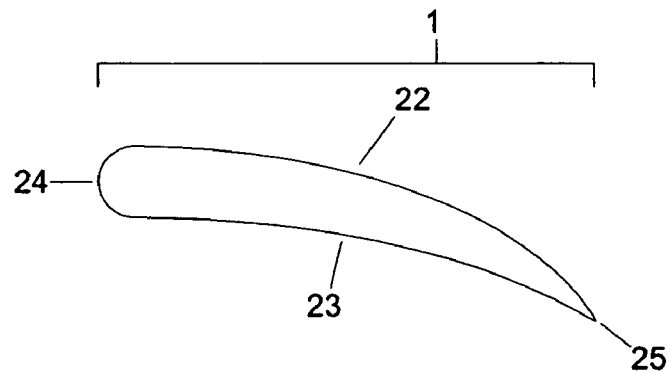
FIG. 6 shows a cross-sectional view of a seal in a sixth embodiment of the present invention.
Figure 7:
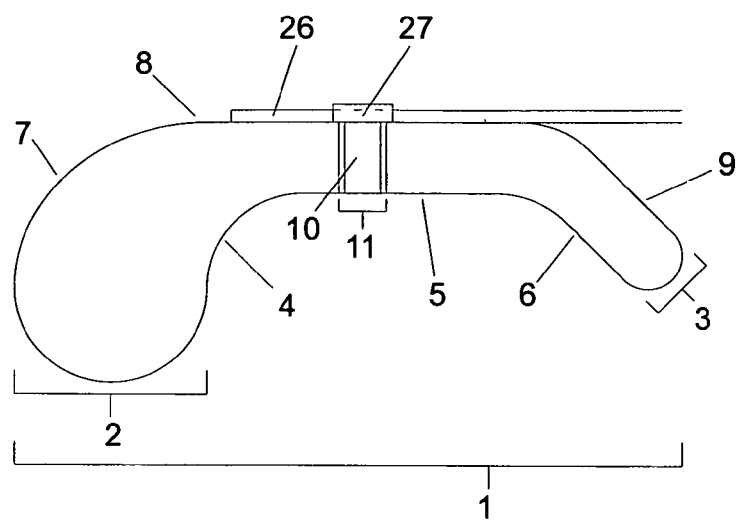
FIG. 7 shows a cross-sectional view of a seal with a fabric material attached according to one embodiment of the present invention, showing a fabric material 26 and a snap fastener receptacle 27.

FIG. 6 shows a cross-sectional view of another embodiment of the present invention. For convenience, the discussion focuses on a particular orientation of the seal in space, but it will be understood that the present invention may be used in any spatial orientation. The seal 1 comprises a curved top exterior surface 22, a curved exterior bottom surface 23, a curved left portion 24, and a flattened right portion 25. The seal slopes downward and decreases in thickness from left to right. The lower surface 23 of the seal is designed to provide a curving point of contact with an object such as a side wall, for example, of a marine vessel hull. The seal may be attached to the surface of an object using any suitable means, such as by means of gluing, stitching, nailing, bolting, tacking, fastening, snapping, bonding, or Velcro. One or more additional objects may be attached to the upper surface 22 of the seal. In preferred embodiments, the upper surface of the seal is used to attach one or more objects that comprise a flexible top covering for the object attached to the lower surface of the seal.

We claim:

1. A marine vessel connected to a flexible top covering via a seal, wherein said flexible top covering comprises a fabric material, wherein said seal comprises a first and second surface and a left edge and a right edge separated by a flat central portion, wherein the distance between said left and right edges is between one and two inches, wherein said left and right edges are curved downward to provide a concave exterior lower surface that is said second surface, wherein said left edge is thicker than said right edge, wherein the thickness of said left edge is approximately 0.5 inches, and wherein the thickness of said right edge is approximately 0.2 inches, said first surface attached to said fabric material, said second surface having a central portion parallel to said first surface, and a left portion and a right portion not parallel to said first surface, wherein said central, left, and right portions are each configured to form a distinct contact surface with said marine vessel, wherein said central, left, and right portions of said seal are in contact with said marine vessel, and wherein said fabric material is configured to be detachable and reattachable via an attachment means comprising a snap fastener.

2. The marine vessel of claim 1, wherein said seal is rubber.

3. The marine vessel of claim 1, wherein said flat central portion comprises a hole.

4. The marine vessel of claim 1, wherein said seal is in contact with said marine vessel at a hull of said marine vessel.

5. A method of creating a seal comprising: (a) removably attaching a fabric material directly to a seal, wherein said seal comprises a first and second surface and a left edge and a right edge separated by a flat central portion, wherein the distance between said left and right edges is between one and two inches, wherein said left and right edges are curved downward to provide a concave exterior lower surface that is said second surface, and wherein said left edge is thicker than said right edge, wherein the thickness of said left edge is approximately 0.5 inches, and wherein the thickness of said right edge is approximately 0.2 inches, said first surface attached to said fabric material, said second surface having a central portion parallel to said first surface, and a left portion and a right portion not parallel to said first surface, wherein said central, left, and right portions are each configured to form a distinct contact surface with a marine vessel contacted by said seal, wherein said fabric material is configured to be detachable and reattachable via an attachment means comprising a snap fastener, and wherein said fabric material comprises a flexible top covering for a marine vessel, and (b) attaching said seal to said marine vessel under conditions such that said central, left, and right portions of the seal each form a distinct contact surface with said marine vessel.

6. The method of claim 5, wherein said seal is rubber.

* * * * *